(12) United States Patent
Nemeh et al.

(10) Patent No.: US 7,854,801 B2
(45) Date of Patent: Dec. 21, 2010

(54) USES OF HIGH MULLITE INDEX CALCINED KAOLIN

(75) Inventors: Saad Nemeh, Ellicott City, MD (US); Ken Folmar, Macon, GA (US)

(73) Assignee: BASF Corporation, Florham Park, NJ (US)

( * ) Notice: Subject to any disclaimer, the term of this patent is extended or adjusted under 35 U.S.C. 154(b) by 462 days.

(21) Appl. No.: 11/169,191

(22) Filed: Jun. 28, 2005

(65) Prior Publication Data

US 2006/0014879 A1 Jan. 19, 2006

Related U.S. Application Data

(60) Provisional application No. 60/585,445, filed on Jul. 2, 2004.

(51) Int. Cl.
*C04B 14/04* (2006.01)
(52) U.S. Cl. ...................................... 106/486; 106/484
(58) Field of Classification Search .................. 106/288, 106/308, 309, 484, 486
See application file for complete search history.

(56) References Cited

U.S. PATENT DOCUMENTS

| | | | | |
|---|---|---|---|---|
| 3,419,517 A | | 12/1968 | Hedrick et al. | |
| 3,904,566 A | * | 9/1975 | Cudby | ........................ 523/139 |
| 4,216,106 A | * | 8/1980 | Miller | ........................ 252/570 |
| 4,221,697 A | | 9/1980 | Osborn et al. | ............. 260/42.53 |
| 4,251,576 A | * | 2/1981 | Osborn et al. | ................ 428/331 |
| 4,414,199 A | * | 11/1983 | Strobridge | .................... 424/52 |
| 4,568,402 A | * | 2/1986 | Ogawa et al. | ............. 156/89.22 |
| 4,678,517 A | | 7/1987 | Dunaway | .................... 106/309 |
| 4,781,818 A | | 11/1988 | Reagan et al. | ................ 208/251 |
| 4,950,628 A | * | 8/1990 | Landon et al. | .............. 501/119 |
| 5,094,902 A | | 3/1992 | Haenggi et al. | ............. 428/150 |
| 6,407,023 B1 | | 6/2002 | Prior, Jr. et al. | ............. 501/125 |
| 6,521,703 B2 | | 2/2003 | Zarnoch et al. | ................ 525/17 |
| 6,528,572 B1 | | 3/2003 | Patel et al. | .................... 524/495 |
| 6,627,704 B2 | | 9/2003 | Yeager et al. | ................ 525/391 |
| 6,652,642 B2 | | 11/2003 | Sare et al. | .................... 106/486 |
| 6,734,262 B2 | | 5/2004 | Patel | ........................ 525/419 |
| 7,148,169 B2 | * | 12/2006 | Sare et al. | .................... 501/141 |
| 2005/0142349 A1 | * | 6/2005 | Irwin et al. | ................. 428/323 |

FOREIGN PATENT DOCUMENTS

EP 0130 734 1/1985

* cited by examiner

*Primary Examiner*—Nathan M Nutter
(74) *Attorney, Agent, or Firm*—Bernard Lau

(57) ABSTRACT

Disclosed are methods of making calcined kaolin having a high mullite content involving heating to certain temperatures. Also disclosed are systems for making the calcined kaolin having a high mullite content and polymer composites containing the calcined kaolin having a high mullite content. The present calcined kaolin having a high mullite content is particularly useful in making polymer composites. The polymer composites may be used in electrical cable.

14 Claims, 1 Drawing Sheet

USES OF HIGH MULLITE INDEX CALCINED KAOLIN

This application claims priority to Provisional Application U.S. Ser. No. 60/585,445 filed Jul. 2, 2004.

FIELD OF THE INVENTION

The present invention generally relates to processes and products that are made using high mullite index calcined kaolin. In particular, the present invention relates to various aspects of high mullite index calcined kaolin having improved dry flow properties.

BACKGROUND OF THE INVENTION

Polymers include natural and synthetic substances composed of very large molecules called macromolecules that are multiples of simpler chemical units called monomers. Polymers make up many of the materials in living organisms, including, for example, proteins, cellulose, nucleic acids, natural rubber and silk. Polymers may be synthesized in a laboratory, and such synthetic polymers have led to such commercially important products as plastics, synthetic fibers, and synthetic rubber.

Synthetic polymers are well known. For example, in 1931 the manufacture of neoprene, a synthetic rubber, began. Nylon is a synthetic thermoplastic material introduced in 1938. In order to improve various properties of synthetic polymers, additive materials are incorporated therein. Additive materials may improve properties such as strength, stiffness/rigidity, dimensional stability, appearance, and the like, as well as lower costs associated with making the synthetic polymers.

One concern associated with incorporating additive materials into synthetic polymers is that while some properties are improved, other properties are often compromised. One example is improving the strength of nylon by adding glass fibers thereto. However, when inorganic fillers are added to polyamides such as nylon without pretreatment, satisfactory properties cannot be obtained because of the poor affinity of the inorganic fillers for the polyamides. The poor affinity results in nylon products that are brittle and of low commercial value. Accordingly, selecting any given additive material for incorporation into a synthetic polymer necessarily means that certain polymer properties may be detrimentally affected. Moreover, it is often difficult to predict whether any given additive material will have a positive or negative effect on each polymer property. Such poor predictability is exacerbated by the fact that different additive materials effect polymer properties differently depending not only on the identity of the polymer, but also on such external factors such as temperature, radiation, and so forth.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The present invention provides calcined kaolin having a high mullite content and processes and polymer composites that are made using calcined kaolin having a high mullite content. The polymer composites that contain the calcined kaolin having a high mullite content have improved mechanical and/or thermal properties compared to a similar polymer that does not contain the calcined kaolin having a high mullite content. Furthermore, the high mullite index calcined kaolin unexpectedly provides similar mechanical and/or thermal properties to polymers containing lower mullite index calcined kaolin.

Aspects of the invention relate to calcined kaolin having a high mullite content and methods of making calcined kaolin having a high mullite content. The methods involve heating kaolin to a temperature from about 1,000 to about 1,3000° C. for a sufficient period of time to form a major amount of mullite. The calcined kaolin having a high mullite content has an advantageous dry flow rate, which is better than conventional calcined kaolin contain little or no mullite. The surface area and morphology of the high mullite index calcined kaolin can likewise be manipulated improving subsequent dispersion in the polymer system.

Another aspect of the invention relates to polymer composites (and methods of making the polymer composites) containing a polymer matrix and calcined kaolin having a high mullite content.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
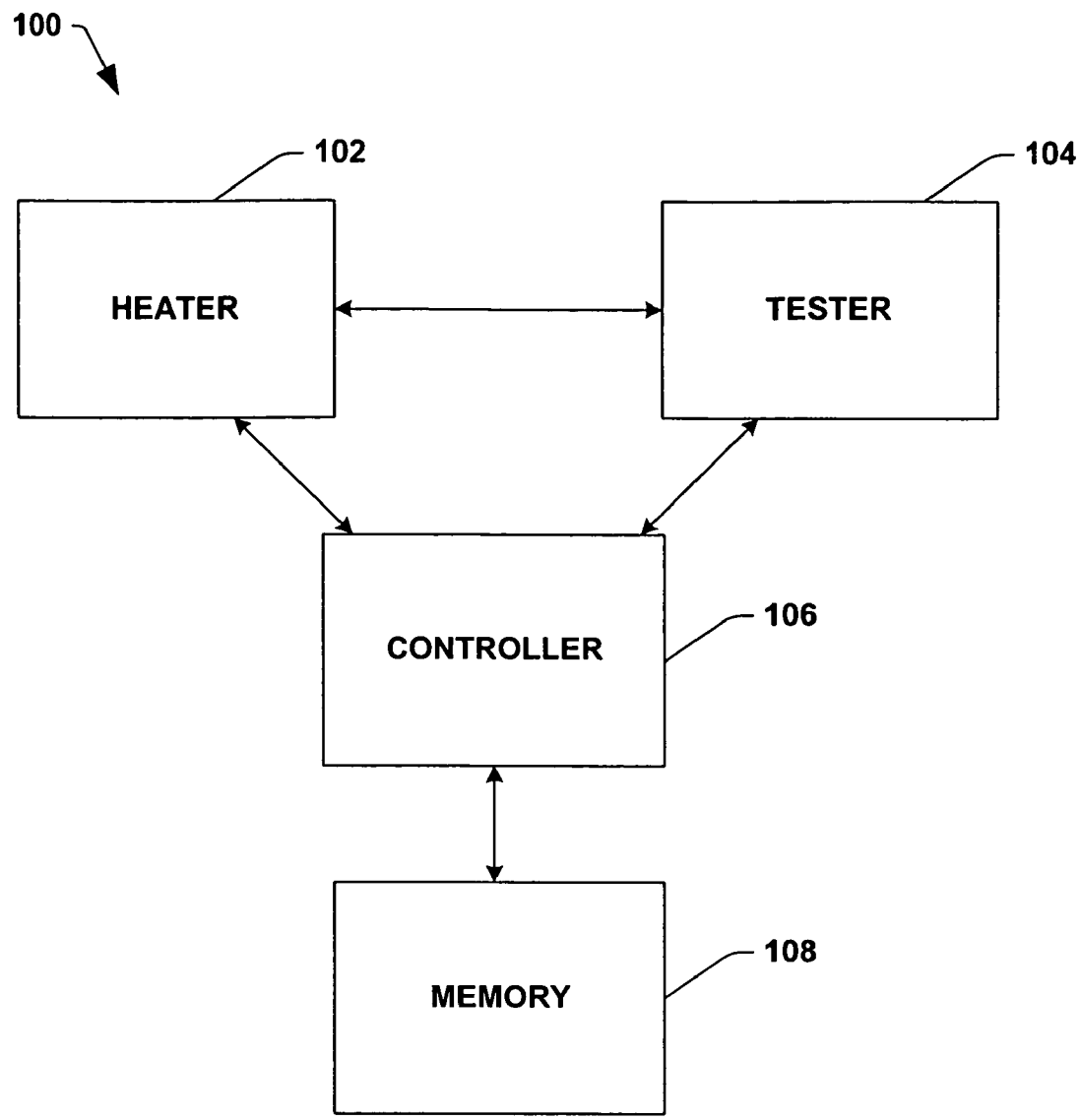
FIG. 1 is a schematic diagram of a system for automated processing of calcined kaolin having a high mullite content in accordance with an aspect of the present invention.

Kaolin exists naturally in the hydrous form. In the hydrous form, kaolinite minerals form crystal structures that are linked together by hydroxyl containing moieties. Hydrous kaolin may be converted to calcined kaolin containing a major amount of mullite by thermal processes. Such processes result in a dehydroxylation of the kaolin and an aggregation of the particles, and convert the crystal structure to an amorphous form.

Calcined kaolin containing a major amount of mullite, high mullite index calcined kaolin, or calcined kaolin having a high mullite content, used interchangeably herein, means a heat treated kaolin that contains at least 20% by weight mullite. In another embodiment, the calcined kaolin having a high mullite content contains at least about 25% by weight mullite. In yet another embodiment, the calcined kaolin having a high mullite content contains at least about 30% by weight mullite. In still yet another embodiment, the calcined kaolin having a high mullite content contains at least about 35% by weight mullite. The calcined kaolin having a high mullite content may optionally contain fully calcined kaolin and/or minor amounts of metakaolin (minor amounts being less than about 20% by weight).

Kaolin is a fine usually white or gray clay formed by the weathering of aluminous minerals (as feldspar) and mainly consists of kaolinite. Kaolinite is commonly represented by one or more of the chemical formulae $Al_4Si_4O_{10}(OH)_8$; $Al_2O_3 \cdot 2SiO_2 \cdot 2H_2O$; and/or $Al_2Si_2O_5(OH)_4$. Any kaolin may be employed to provide the calcined kaolin having a high mullite content including one or more of crude kaolin, coarse hydrous kaolin, and fine hydrous kaolin. In this connection, a full fraction crude kaolin or any size fraction may be heat treated to provide the calcined kaolin having a high mullite content.

Kaolin mined from the Earth is optionally subjected to preliminary processing and/or beneficiation to facilitate transportation, storage, and/or handling. The particular preliminary processing employed, if any, is not critical to the present invention. For example, crude kaolin can be subjected to one or more of the following operations: crushing, grinding, delamination (wet milling, slurry milling, wet grinding, and the like), filtration, fractionation, pulverization, flotation, selective flocculation, magnetic separation, floc/filtration, bleaching, and the like before or after the heat treatment. Crushing reduces kaolin rock to gravel. Grinding involves processing crude kaolin to achieve a desired particle size distribution using, for example, dry milling and/or air flotation. Delamination destroys the booklet structure of hydrous kaolin. Filtration is employed to effectively remove particles above a threshold size, unwanted titania, and/or iron compounds from kaolin. Fractionation is employed to separate kaolin particle size fractions.

In one embodiment, a hydrous kaolin wherein at least about 90% by weight of the kaolin has an average particle diameter of about 50 microns or less and at least about 25% by weight of the kaolin has an average particle diameter of about 5 microns or less is provided for the heat treatment. In another embodiment, a hydrous kaolin wherein at least about 90% by weight of the kaolin has an average particle diameter of about 20 microns or less and at least about 25% by weight of the kaolin has an average particle diameter of about 2 microns or less is provided for the heat treatment.

There are a number of methods and devices for measuring particle sizes in this range. For the purposes of this invention particle size is determined by conventional sedimentation techniques using Micromeretics, Inc.'s SEDIGRAPH® 5100 particle size analyzer. Particles are slurried in water with a dispersant and pumped through the detector with agitation to disperse loose agglomerates.

Prior to heat treatment, free water is optionally removed from the hydrous kaolin to dry the kaolin. The kaolin is dried by any suitable technique. Examples of drying kaolin include spray drying, flash drying, rotary drying, or other conglomeration techniques. These drying techniques are known in the clay industry.

Optionally drying the kaolin is performed to reduce the moisture level of the kaolin, in part, to facilitate subsequent heat treatments. In one embodiment, after drying, the kaolin has a moisture level of less than about 1.5% by weight. In another embodiment, the kaolin has a moisture level of less than about 1% by weight. In yet another embodiment, the kaolin has a moisture level of less than about 0.5% by weight.

The hydrous kaolin is subjected to heat treatment to provide calcined kaolin having a high mullite content. When kaolin is heated, it undergoes a series of characteristic changes, detectable by various methods including differential thermal analysis (DTA) and X-Ray Diffractometry. Incremental heat treatment is employed to control the calcination process to induce the desired amount of mullite in the finished product. Heat treatment is performed under one of an inert atmosphere, an oxidizing atmosphere, and a reducing atmosphere. Incremental heating kaolin can induce a number of crystalline form changes. The first of these occur when the said kaolin fraction reaches a temperature in the 550 to about 800° C. range. In this range, the kaolin dehydroxylates, giving up its water of hydration. This is characterized by an endothermic dehydration reaction resulting in the conversion of hydrous kaolin to a synthetic mineral known as metakaolin. The metakaolin state is conveniently ascertained by acid solubility testing because the alumina in the clay is virtually completely soluble in strong mineral acid. Metakaolin is sometimes referred to as partially calcined kaolin.

Further heat treatment again rearranges the crystalline structure of metakaolin and renders the resulting synthetic mineral substantially amorphous and chemically inert. This condition occurs after the feed material reaches temperatures in excess of 800° C. (particularly from about 900 to about 950° C. where a crystalline rearrangement occurs that is accompanied by an exothermic reaction). As heat treatment is intensified, further structural changes such as densification take place. Kaolin processed up to about 950° C. is traditionally considered fully calcined kaolin.

Mullite ($3Al_2O_3 \cdot SiO_2$) forms with incremental heat treatment to temperatures in the range from about 1,000 to about 1,300° C. for a sufficient period of time. The heating operation may be performed in a single or multiple stage operation to yield the desired amount of mullite in the product. The heating operation is controlled to form a major amount of mullite. The heating operation may be performed two or more times if required to form a major amount of mullite in a given batch.

In one embodiment, the kaolin is heated to a temperature from about 1,000 to about 1,3000° C. for a time from about 1 second to about 10 hours. In another embodiment, the kaolin is heated to a temperature from about 1,010 to about 1,2000° C. for a time from about 1 minute to about 5 hours. In yet another embodiment, the kaolin is heated to a temperature from about 1,020 to about 1,1000° C. for a time from about 5 minutes to about 4 hours.

Calcining or heat treating may be performed in any suitable manner to provide a major amount of mullite. Heating procedures typically include soak calcining, flash calcining, and/or a combination of flash calcining/soak calcining. In soak calcining, a hydrous kaolin is heat treated at a desired temperature for a period of time (for example, from at least about 1 minute to about 5 or more hours), sufficient to dehydroxylate the kaolin and form a major amount of mullite. In flash calcining, a hydrous kaolin is heated rapidly for a period of less than about 10 seconds, typically less than about 1 second. In a flash/soak calcining operation, metakaolin is instantaneously produced during flash calcination and then processed to a finished product requirement using soak calcination.

The furnace, kiln, or other heating apparatus used to effect heating of the hydrous kaolin may be of any known kind. Known devices suitable for carrying out soak calcining include high temperature ovens, and rotary and vertical kilns. Known devices for effecting flash calcining include toroidal fluid flow heating devices.

After heat treatment, the calcined kaolin having a high mullite content contains from 20% to about 100% by weight mullite, from about 0% to about 80% by weight fully calcined kaolin, and from about 0% to about 50% metakaolin. In another embodiment, the calcined kaolin having a high mullite content contains about 25% to about 90% by weight mullite, from about 10% to about 75% by weight fully calcined kaolin, and optionally from about 1% to about 30% metakaolin. In yet another embodiment, the calcined kaolin having a high mullite content contains from about 30% to about 60% by weight mullite, from about 40% to about 70% by weight fully calcined kaolin, and optionally from about 2% to about 10% metakaolin.

In one embodiment, the calcined kaolin having a high mullite content processed in accordance with the present invention has a brightness of at least about 87. In another embodiment, the calcined kaolin having a high mullite content processed in accordance with the present invention has a brightness of at least about 90. In yet another embodiment, the calcined kaolin having a high mullite content processed in accordance with the present invention has a brightness of at least about 92.

In one embodiment, the calcined kaolin having a high mullite content processed in accordance with the present invention has a particle size distribution wherein at least about 60% by weight of the particles have size of 2 microns or less, at least about 30% by weight of the particles have size of 1 micron or less, and at least about 5% by weight of the particles have size of 0.5 microns or less. In another embodiment, the calcined kaolin having a high mullite content processed in accordance with the present invention has a particle size distribution wherein at least about 65% by weight of the particles have size of 2 microns or less, at least about 40% by weight of the particles have size of 1 micron or less, and at least about 10% by weight of the particles have size of 0.5 microns or less. In yet another embodiment, the calcined kaolin having a high mullite content processed in accordance with the present invention has a particle size distribution wherein at least about 75% by weight of the particles have size of 2 microns or less, at least about 50% by weight of the particles have size of 1 micron or less, and at least about 12% by weight of the particles have size of 0.5 microns or less.

In one embodiment, the calcined kaolin having a high mullite content processed in accordance with the present invention has a 250 g dry flow rate test of less than about 100 seconds. In another the calcined kaolin having a high mullite content processed in accordance with the present invention has a 250 g dry flow rate of less than about 80 seconds. In yet another the calcined kaolin having a high mullite content processed in accordance with the present invention has a 250 g dry flow rate of less than about 65 seconds. In still yet another the calcined kaolin having a high mullite content processed in accordance with the present invention has a 250 g dry flow rate of less than about 40 seconds. In a dry-flow experiment, 250 grams of a material is allowed to pass through a stemmed aluminum funnel (2 cm in diameter at stem) and the time to pass through the stem is recorded. Relative dry-flow is a good indication of how easily the material can be handled. The calcined kaolin having a high mullite content processed in accordance with the present invention has excellent dry flow rates, which in part, contribute to advantageous properties of polymer composites containing the high mullite calcined kaolin and advantageous processing properties of polymer composites containing the high mullite calcined kaolin.

After heat treatment, optional milling and classifying can be effected to provide a desired degree of product uniformity. There are numerous technologies suitable for the purpose. One example would be entail passing the calcined kaolin having a high mullite content through an air classifying mill which contains an impact rotor for attriting the heat treated kaolin and an integral vane rotor classifier for classifying the attrited material and recycling particles that exceed a desired size.

The calcined kaolin having a high mullite content may find use as is or be surface treated with a functional compound to enhance subsequent performance including enhance performance in polymer systems. Examples of functional compounds include organo silane compounds, chromium compounds, surface active agents, fatty acids, and latexes. Such functional compounds improve the wetting property or reactivity between the calcined kaolin having a high mullite content and the polymer matrix. Owing to the unique properties of calcined kaolin having a high mullite content produced in accordance with the present invention, one advantage is that the calcined kaolin having a high mullite content need not be treated with a functional compound before incorporation into a polymer matrix.

The polymer composites contain the calcined kaolin having a high mullite content distributed within a polymer matrix. Calcined kaolin having a high mullite content may be distributed uniformly or non-uniformly within the polymer matrix to yield desired product properties. The polymer matrix may be one or more of a thermoplastic polymer matrix, a curable polymer matrix, a vulcanizable polymer matrix, a thermoset polymer matrix, and an elastomeric polymer matrix. Notable polymer matrixes include polyamides and rubbers. The polymer matrix may be one or more of a straight chain polymer, a branched polymer, a copolymer, a terpolymer, a graft copolymer, and a cross-linkeded polymer. Generally speaking, the calcined kaolin having a high mullite content is combined with the polymer matrix about the same time that a filler is combined with the polymer matrix to form a reinforced polymer. The polymer composites are made by combining the calcined kaolin having a high mullite content with the monomers that form the polymer matrix, a molten or liquid form of the polymer/prepolymer, or before the polymer is cured, cross-linked, or set.

The polyamides used in this invention are well known by the generic term "nylon" and are typically long chain synthetic polymers containing amide groups (—C(O)NH—) along the main polymer chain. The polyamides used in this invention can be aliphatic and/or aromatic. Mixtures or copolymers of aliphatic polyamides and aromatic polyamides may be employed. The polyamide can be any crystalline or amorphous high molecular weight homopolymer, copolymer, or terpolymer having recurring amide units within the polymer chain. In copolymer and terpolymer systems, more than 50 mole percent of the repeating units are amide-containing units.

Examples of polyamides are polylactams such as nylon 6, polyenantholactam (nylon 7), polycapryllactam (nylon 8), polylauryllactam (nylon 12), and the like; homopolymers of amino acids such as polypyrrolidinone (nylon 4); copolyamides of dicarboxylic acid and diamine such as nylon 6/6, polyhexamethyleneazelamide (nylon 6/9), polyhexamethylene-sebacamide (nylon 6/10), polyhexamethyleneisophthalamide (nylon 6,1), polyhexamethylenedodecanoic acid (nylon 6/12) and the like; homopolymers of 11-aminoundecanoic acid (nylon 11), and copolymers thereof, polyaromatic and partially aromatic polyamides; copolyamides such as copolymers of caprolactam and hexamethyleneadipamide (nylon 6,6/6), or a terpolyamide (e.g., nylon 6,6/6,6); block copolymers such as polyether polyamides; or mixtures thereof. Specific examples of the aromatic polyamides are poly(hexamethylene diamine terephthalamide), and poly(hexamethylene diamine isophthalamide).

Rubbers may be natural or synthetic. Rubbers may be made with or without a catalyst. There is no limitation regarding molecular weight of the rubbers (or the polymer matrix for that matter). Rubbers may be halogenated or non-halogenated.

Examples of rubber include natural rubber (Hevea and Guayule), polyisoprene rubber, styrene butadiene rubber (SBR), emulsion styrene butadiene rubber, styrene isoprene butadiene rubber (SIB), butadiene isoprene rubber, polybutadiene rubber, butyl rubbers, halobutyl rubbers, ethylene propylene rubbers (EPR), ethylene/propylene/diene rubber (EPDM), metallocene catalyzed polyethylene (mPE), cross-linked polyethylene, neoprenes, nitrile rubbers, chlorinated polyethylene rubbers, silicone rubbers, thermoplastics, acrylate butadiene rubber, chloroisobutene isoprene rubber, nitrile butadiene rubber, nitrile chloroprene rubber, styrene chloroprene rubber, styrene isoprene rubber, and combinations thereof.

Examples of additional polymer matrixes include natural resins and synthetic resins, polystyrene and its mixed polymers, polyolefins, in particular polyethylene and polypropylene, polyacrylic compounds, polyvinyl compounds, for example polyvinyl chloride and polyvinyl acetate, filaments made of viscose and cellulose ethers, cellulose esters, polyurethanes, polyesters, for example polyglycol terephthalates, polycarbonates, polyimides, and polyacrylonitrile. Polyolefins specifically include polyethylene-polypropylene copolymers, high density polyethylene, medium density polyethylene, low density polyethylene, very low density polyethylene, and linear low density polyethylene. Polyesters include polyethylene terephthalate and polybutylene terephthalate and the corresponding mixed condensation products based on polyesters.

The polymer composites contain a suitable amount of the calcined kaolin having a high mullite content distributed within a polymer matrix to improve at least one property of the polymer matrix. In one embodiment, the polymer composite contains from about 0.1% to about 75% by weight of the calcined kaolin having a high mullite content and from about 25% to about 99.9% by weight of the polymer matrix. In another embodiment, the polymer composite contains from about 0.5% to about 50% by weight of the calcined kaolin having a high mullite content and from about 50% to about 99.5% by weight of the polymer matrix. In yet another embodiment, the polymer composite contains from about 1% to about 25% by weight of the calcined kaolin having a high mullite content and from about 75% to about 99% by weight of the polymer matrix.

The polymer composites may optionally contain additional additives such as fillers, property enhancers, pigments, surfactants, and the like. In one embodiment, the polymer composites contain from about 0.1% to about 75% by weight of one or more additional additives. In another embodiment, the polymer composites contain from about 1% to about 25% by weight of one or more additional additives.

The polymer composites that contain the calcined kaolin having a high mullite content have improved mechanical and/or thermal properties compared to a similar polymer that does not contain the calcined kaolin having a high mullite content. That is, the polymer composites that contain the calcined kaolin having a high mullite content have at least one of improved tensile strength, improved flexural strength, improved elasticity modulus, improved impact strength, improved ductility, improved heat distortion temperature, improved electrical and/or temperature insulation properties, improved flow characteristics, improved flame retardancy, improved dimensional stability, improved hardness, and improved creep characteristics. Furthermore, the polymer composites that contain the calcined kaolin having a high mullite content have at least one of the above mentioned improved properties at low temperatures (such as below about 5° C.).

Calcined clay with a high mullite content can be used in any mineral filled polymer composite where kaolin has proven to have utility. Examples include, but are not limited to injection molded parts, extruded parts and electrical cable. The improved flow characteristics of calcined kaolin with a high mullite content will also improve production of industrial and architectural coatings.

Referring to FIG. 1, a system 100 to process the calcined kaolin having a high mullite content is shown. The system includes a heater 102 coupled to a tester 104 and a controller 106. The heater 102 heats the kaolin to provide calcined kaolin having a high mullite content and optionally one or more of metakaolin, partially calcined kaolin, and calcined kaolin. The tester 104 can be any device that measures at least one parameter associated with the kaolin being processed (such as % mullite content, particle size distribution, brightness, roughness, % moisture content, % partially calcined kaolin content, % calcined kaolin content, % content of particular chemical, and the like) or any parameter associated with the heater 102 (such as the temperature with the heater 102 or energy supplied to the heater 102).

While the heater 102 is operating, or during an interruption, the tester 104 tests the kaolin being processed. For example, while the heater 102 is operating, a sample of kaolin may be withdrawn and tested to determine a parameter, such as % mullite content or particle size distribution. The tester 104 sends the data generated by the testing to the controller 106, which is adapted to receive such kaolin parameter data from the tester 104. Alternatively or additionally, the tester 104 may measure a parameter of the heater 102, and send data associated with the heater parameter to the controller 106.

The controller 106 analyzes such data, and based on the analysis, sends a signal to the heater 102 to either continue the process, modify the process (such as increase temperature, decrease heating time, and so forth), or terminate the process. To facilitate such analysis, a data store or memory 108 may be coupled to the controller 106 so that the controller 106 can compare data sent by the tester 104 to stored data. The controller 106 may send a signal to the tester 104 to perform a test. Examples of ways in which the controller 106 can modify a process include increasing or decreasing the temperature in the heater 102; increasing or decreasing the heating time in the heater 102; increasing or decreasing the rate of temperature change in the heater 102; continue operating the heater 102 or other device to achieve a certain desired particle size distribution; directing a repeat of an act such as requiring a second heating act; and the like.

The following examples illustrate the present invention. Unless otherwise indicated in the following examples and elsewhere in the specification and claims, all parts and percentages are by weight, all temperatures are in degrees Centigrade, and pressure is at or near atmospheric pressure. Also, any parameter of a given property in a range may be combined with another parameter of the same property in a different range.

Two batches of kaolin are heated in accordance with the present invention. Table 1 shows the particle size distribution, average particle size, and dry flow rate values.

TABLE 1

| Size | Batch 1 | Batch 2 |
| --- | --- | --- |
| <2 microns | 65% by wt. | 82% by wt. |
| <1 micron | 42% by wt. | 53% by wt. |
| <0.5 microns | 12% by wt. | 12% by wt. |
| APS | 1.24 microns | 0.195 microns |
| DFR | 35 seconds | 62 seconds |

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A polymer composite, comprising (a) from about 25% to about 99.9% by weight of a polymer matrix; and (b) from about 0.1% to about 75% by weight of a calcined kaolin having a high mullite content of at least 25% by weight with a 250 g dry flow rate of less than about 100 seconds.

2. The polymer composite of claim 1 wherein said calcined kaolin having a high mullite content contains at least about 30% by weight of said mullite.

3. The polymer composite of claim 1 wherein said calcined kaolin having a high mullite content contains at least about 40% by weight of said mullite.

4. The polymer composite of claim 1 comprising (a) from about 50% to about 99.5% by weight of a polymer matrix; and (b) from about 0.5% to about 50% by weight of a calcined kaolin having a high mullite content of at least 25% with a 250 g dry flow rate of less than about 100 seconds.

5. The polymer composite of claim 1 comprising (a) from about 75% to about 99% by weight of a polymer matrix; and (b) from about 1% to about 25% by weight of a calcined kaolin having a high, mullite content of at least 25% with a 250 g dry flow rate of less than about 100 seconds.

6. The polymer composite of claim 1 wherein said calcined kaolin having high mullite content has a particle size distribution wherein at least about 60% by weight of said kaolin particles have an average particle size of 2 microns or less, at least about 30% by weight of said kaolin particles have an average particle size of 1 micron or less, and at least about 5% by weight of said kaolin particles have an average particle size of 0.5 micron or less.

7. The polymer composite of claim 1 wherein said calcined kaolin having high mullite content has a particle size distribution wherein at least about 65% by weight of said kaolin particles have an average particle size of 2 microns or less, at least about 40% by weight of said kaolin particles have an average particle size of 1 micron or less, and at least about 10% by weight of said kaolin particles have an average particle size of 0.5 micron or less.

8. The polymer composite of claim 1 wherein said calcined kaolin having high mullite content has a particle size distribution wherein at least about 75% by weight of said kaolin particles have an average particle size of 2 microns or less, at least about 50% by weight of said kaolin particles have an average particle size of 1 micron or less, and at least about 12% by weight of said kaolin particles have an average particle size of 0.5 micron or less.

9. The polymer composite of claim 1 wherein said calcined kaolin having a high mullite content has a dry flow rate of less than about 80 seconds.

10. The polymer composite of claim 1 wherein said calcined kaolin having a high mullite content has a dry flow rate of less than about 65 seconds.

11. The polymer composite of claim 1 wherein said calcined kaolin having a high mullite content has a dry flow rate of less than about 40 seconds.

12. The polymer composite of claim 1 having improved mechanical and/or thermal properties.

13. The polymer composite of claim 12 wherein said improved mechanical and/or thermal properties is selected from the group consisting of tensile strength, flexural strength, elasticity modulus, impact strength, ductility, heat distortion temperature, electrical insulation properties, temperature insulation properties, flow characteristics, flame retardancy, dimensional stability, hardness and creep characteristics.

14. The polymer composite of claim 1 further comprising additional additives selected from the group consisting of fillers, property enhancers, pigments, and surfactants.

* * * * *